United States Patent [19]

McWhorter

[11] 4,248,199
[45] Feb. 3, 1981

[54] BIDIRECTIONAL PULSE JET EJECTOR MANIFOLD

[76] Inventor: Edward M. McWhorter, 6931 Greenbrook Cir., Citrus Heights, Calif. 95610

[21] Appl. No.: 102,910

[22] Filed: Dec. 12, 1979

[51] Int. Cl.³ .......................... F02B 47/08; F01N 3/10
[52] U.S. Cl. ...................................... 123/568; 60/307; 60/308; 123/315; 123/433
[58] Field of Search ................. 60/304, 305, 306, 307, 60/308; 123/433, 315, 568

[56] References Cited

U.S. PATENT DOCUMENTS

| | | | |
|---|---|---|---|
| 2,123,302 | 7/1938 | Groth | 123/433 |
| 2,239,262 | 4/1941 | Violet | 123/315 |
| 2,295,436 | 9/1942 | Tendler | 60/305 |
| 3,045,422 | 7/1962 | Houdry | 60/307 |
| 3,468,124 | 9/1969 | Hrabowecks | 60/306 |
| 3,590,579 | 7/1971 | Takahashi | 60/305 |
| 3,777,721 | 12/1973 | Sawada | 60/307 |
| 4,108,119 | 8/1978 | McWhorter | 123/433 |
| 4,176,632 | 12/1979 | Franke | 123/433 |

FOREIGN PATENT DOCUMENTS

| | | | |
|---|---|---|---|
| 52-68623 | 6/1977 | Japan | 60/304 |
| 52-70222 | 6/1977 | Japan | 60/308 |
| 52-70223 | 6/1977 | Japan | 60/308 |

*Primary Examiner*—Wendell E. Burns

[57] ABSTRACT

The invention relates to new and useful improvements in the design of fluid ejectors and in particular to their use in the exhaust and induction manifolds of the piston driven internal combustion engine. Accelerated exhaust gases jetting from an engine cylinder side-port are directed through an intervening air space toward a diffuser duct. Impact between the accelerated exhaust particles and air particles within the air space causes a resultant vector change of the momenta of the sum total of reacting particles in a manner which reverses the direction of air flow toward the diffuser. The inertial flow of the fresh air stream, drawn into the air space after the exhaust cycle is complete, is again directed toward the engine cylinder side-port nozzle to facilitate induction on the subsequent intake stroke of the piston.

9 Claims, 5 Drawing Figures

BIDIRECTIONAL PULSE JET EJECTOR MANIFOLD

CROSS REFERENCE

This application is similar to my copending application Ser. No. 956,666 "Exhaust Jet Manifold" filed Nov. 1, 1978.

BACKGROUND OF THE INVENTION

1. Field of the Invention

The invention falls within the field of fluid flow inducers such as pumps and compressors and more specifically to those types of systems comprising syphons aspirators and ejectors.

The invention is a novel type of exhaust jet ejector which is particularly useful where efficient pumping operations must be performed under conditions of rapidly reversing flow such as that occurring at the side-port of an internal combustion engine cylinder during the alternate exhaust and induction cycles.

2. Description of Prior Art

The jet-ejector and its potential use was first concieved in the early part of this century in Europe by LeBlanc and in England by Parsons who are credited with the initial development.

In keeping with the general understanding, a jet-ejector, as described herein, is considered in the broadest sense as comprising a nozzle whose flow is directed into a diffuser. In this regard a nozzle is defined as any channel designed to increase fluid velocity and reduce stream pressure and conversly a diffuser is defined as any channel designed to reduce fluid velocity and increase stream pressure. Jet-ejectors operate on the principle of momentum exchange and should not be confused with the operation of venturis which depend principally on differential pressures for flow inducement in accordance with Bernoullis' principle.

During the engine exhaust cycle, at the end of the power stroke, the transfer of momentum from the exhaust stream to the air stream within the ejector is initially accomplished under compressible flow conditions with a net temperature decrease. Therefore the pumping action and inducement of air flow toward the diffuser is rather vigorous.

During the induction or intake stroke flow within the ejector air chamber is reversed toward the side-port nozzle. In this instance the flow is accomplished under low pressure ideal conditions and therefore the energy of the flow inducement in this direction is very low. For this reason, any turning losses incurred in the air stream entering the air chamber leading to the nozzle result in reduced velocity and increased dynamic flow losses which severely limit the quantity of air inducted into the engine and therefore decrease the volumetric efficiency.

Originally jet ejectors were designed as steady-state unidirectional flow systems and therefore the arrangement of relative flow paths within the ejector leading to the air chamber was not considered an important factor in the efficiency of the system. However, ejectors used in this particular application operate as pulse systems with rapidly reversing bidirectional flow paths. Therefore stream reversal must be accomplished within an extremely short period of time if the induction is to be effected in an efficient manner.

I have discovered that the bidirectional pulse type of jet-ejector can be made most efficient when the air supply to the air-chamber is directed in such a manner that its flow is directed toward the side-port nozzle. In this way, turning losses within the air-chamber are held to a minimum and stream reversal of the bidirectional flow is accomplished within the shortest period of time. In previous designs of this type of equipment, the direction of air flow to the air-chamber has been aligned in a parallel path with the exhaust flow from the side-port such that stream reversal during the induction phase was accomplished under conditions requiring 180° reversal or turning losses. In the system listed in the cross references the reversal is executed at 90° or slightly less when measured at the point of impingement between the nozzle and the diffuser. In the present invention air enters the air-chamber in a direction nearly opposite and nearly parallel to the exhaust flow from the side-port nozzle. Although the air stream is flowing in a nearly opposite direction its momentum is easily overcome by the vigous critical flow of the exhaust stream and is therefore turned toward the diffuser. However, during the induction cycle the air stream is directed toward the nozzle and therefore dynamic turning losses at the less vigorous ideal pressure conditions are held to a minimum.

The advantages of employing a bidirectional pulse jet ejector at the engine cylinder side-port is in the reduction of bottom-cycle pumping losses and in the reduction of thermal loads on the upper cylinder components. Efficiency losses occurring as a result of bottom-cycle pumping effort consist primarily of exhaust blowdown, exhaust stroke, and general flow losses during the induction stroke. The early evacuation of spent combustion gases through the side-port reduce the system pressure and exhaust mass decreasing the thermal load on the cylinder walls and on the exhaust poppet valve operating in the exhaust port of the upper cylinder head.

SUMMARY OF THE INVENTION

Recognizing the fact that all jet-ejectors up to this point in time have been designed as unidirectional flow systems it is therefore the principal object of this invention to present a system which eleminates the inefficiencies inherent when this type of system is operated in an alternating bidirectional pulse flow mode.

It is therefore an object of this invention to reduce the turning losses at the impingement point between the nozzle and the diffuser during the induction cycle of the engine by causing the air flowing into the air-chamber to be directed at the nozzle.

It is yet another object of the invention to reduce the period required for stream reversal by causing the turning period to occur during the interim period between the exhaust and induction cycle.

It is yet another object of the invention to more effectively reduce the efficiency losses occurring during bottom cycle pumping events.

And still another object of the invention is to more effectively reduce the thermal load on the engine upper cylinder components by the early evacuation of combustion gases from the cylinder side-ports.

All of the aforementioned and still further objects and advantages of the invention will be more clearly understood from the following detailed description of the preferred embodement when read in conjunction with the accompanying drawings.

BRIEF DESCRIPTION OF THE DRAWINGS

There are included as part of the specification drawings which show the details of the preferred embodiment wherein.

DESCRIPTION OF THE PREFERRED EMBODIMENT

Figure 1:
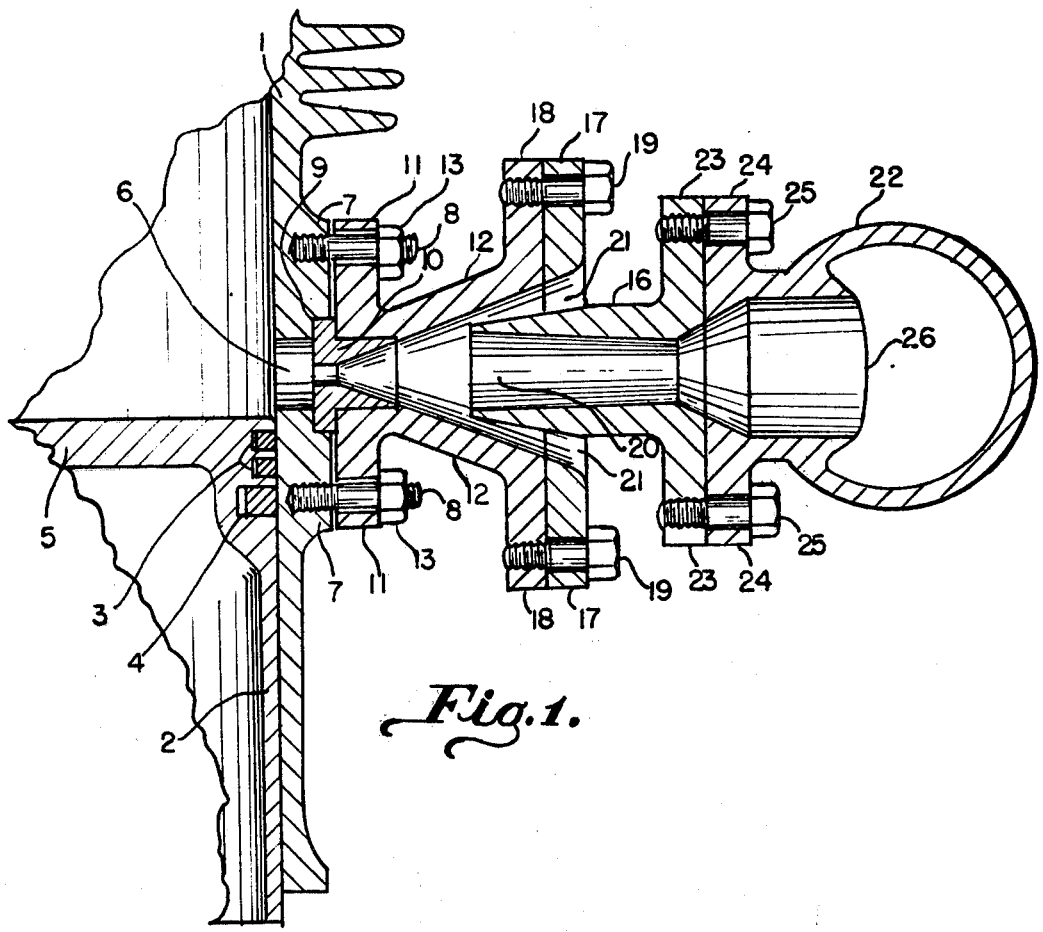
FIG. 1 Is a cross-sectional view of the bidirectional pulse jet ejector shown bolted to the lower portion of an air-cooled engine cylinder.

Referring now to the drawings and to FIG. 1 thereof in particular which is a cross-sectional front view of the bidirectional pulse jet ejector shown bolted to the lower portion of an air-cooled engine cylinder 1 with a portion of piston 2 shown slidable mounted therein. The piston 2 is shown at the bottom-stroke with compression rings 3 and oil wiper ring 4, which are mounted on piston crown 5, below side-port 6 of engine cylinder 1. Cylinder 1 has a slightly thickened section surrounding side-port 6 which is designated as pad 7 in which threaded studs 8 are mounted. A recess 9 is machined in pad 7 which receives jet 10. Jet 10 is clamped in place between recess 9 and flange 11 of air-chamber 12 which is positioned over studs 8 and secured in place by nuts 13.

Figure 2:
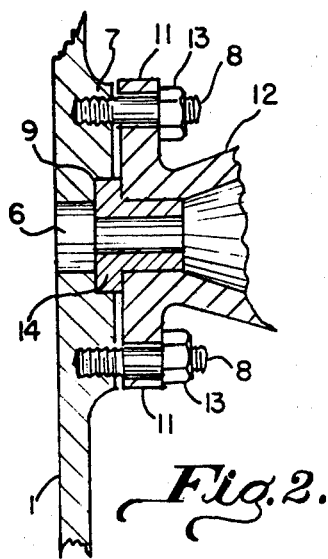
FIG. 2 Is a cross-sectional view showing the installation of a cylindrical jet in the pulse jet assembly.
Figure 3:
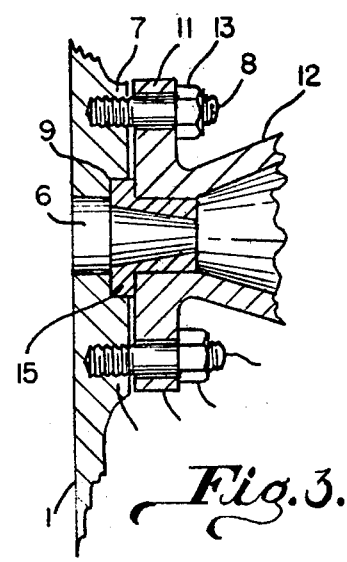
FIG. 3 Is a cross-sectional view showing the installation of a conical convergent jet in the pulse jet ejector assembly.

Jet 10 is internally configured as a divergent conical nozzle as shown in FIG. 1. However, it may also be configured internally in the shape of a cylindrical jet 14 as shown in FIG. 2 or as a convergent jet 15 as shown in FIG. 3. However, the exterior surfaces of jets 14 and 15 have the same exterior interface dimensions of jet 10 and therefore can be clamped in recess 9 by flange 11 as shown in FIGS. 2 and 3 respectively.

Returning to FIG. 1, it can be seen that exhaust duct 16, flange 17 is connected to the air chamber 12 large flange 18 by bolts 19. The exhaust duct 16 forward entrance 20 protrudes into air-chamber 12. The inner surfaces of air-chamber 12 and the outer surfaces of forward entrance 20 do not touch leaving a channel 21 for air to enter air chamber 12. This is the novel feature of this invention which should be clearly understood. Air enters air chamber 12 through channel 21 in a direction which is nearly opposite that of exhaust gases issueing from jet 10. This would not be an acceptable arrangement in steady unidirectional flow systems since the cancellation of momentum between the two opposing systems would result in a net loss of flow toward the exhaust duct 16 and pumping efficiency would be lost. However, in the bidirectional flow process, where the direction of flow alternates between the induction cycle and the exhaust cycle, air flow directly toward the opening of jet 10 greatly facilitates the less vigorous ideal flow during induction since air stream turning losses are not incurred. This is the secret of successful bidirectional jet flow.

Exhaust manifold 22 is securely fastened to exhaust duct 16 by bolting flange 23 to flange 24 with bolts 25. The entrance to exhaust manifold 22 contains a lip 26 which protrudes into the exhaust manifold 22 causing a slightly lower pressure on the downstream side of the lip relative to the flow in exhaust manifold 22 which facilitates flow from the exhaust duct 16 which sustains the momentum of flow after the exhaust cycle is complete which helps to further purge exhaust gases from air chamber 12.

Figure 4:
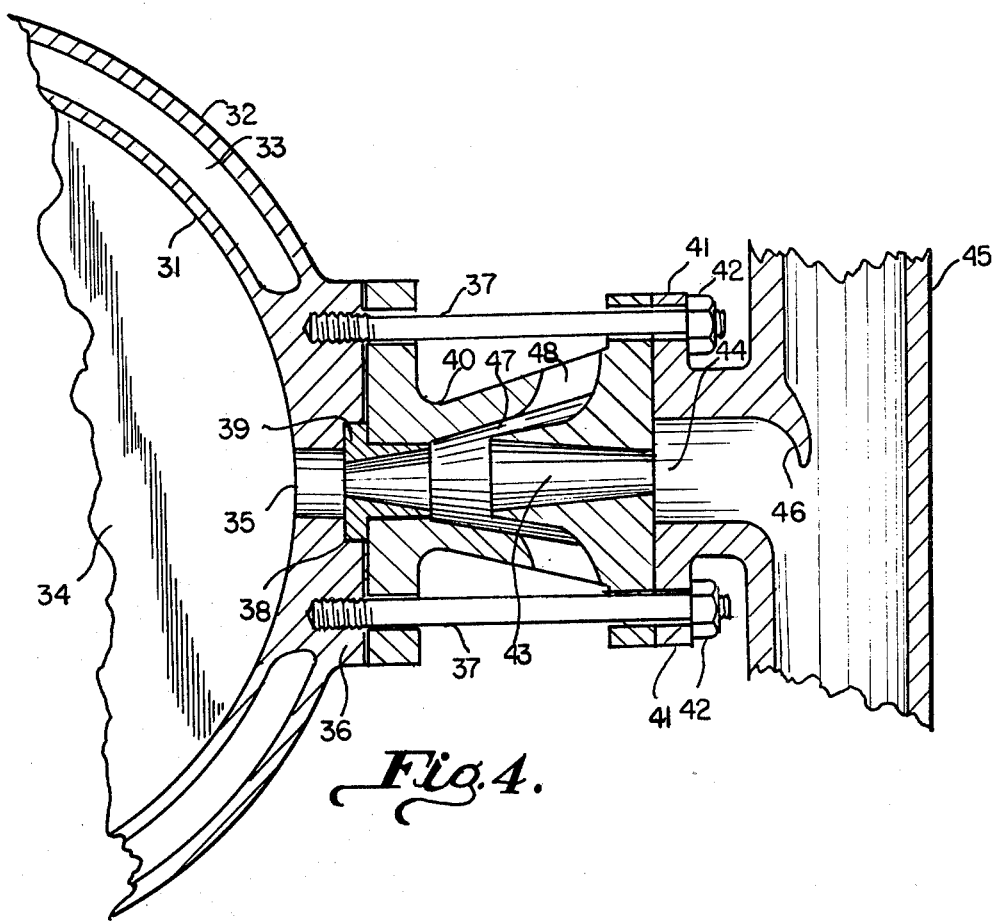
FIG. 4 Is a cross-sectional top view of another version of the pulse jet ejector shown mounted to the lower portion of a water cooled engine cylinder.

Referring now to FIG. 4 which shows a slightly different arrangement of the bidirectional pulse jet ejector manifold mounted on a water-cooled version of the internal combustion piston driven reciprocating engine as viewed from the top. Although the major elements of the system are the same, and serve the same purpose, as those shown in FIG. 1 a different numbering system is used to designate the various components comprising the assembly in order to avoid confusion. Engine cylinder 31 is surrounded by water jacket 32 with an intervening column of water within the space designated by the numerals 33. Piston 34 is slidably mounted in engine cylinder 31. Side-port 35 is surrounded by a thickened section designated as pad 36 in which threaded studs 37 are mounted. A recess 38 is machined in pad 36 and recieves jet 39 which is clamped into position by air-chamber 40 which in turn is clamped between pad 36 and exhaust manifold flange 41 by nuts 42. Air channel 47 is formed between the interior surface of air-chamber 40 and the outer surface of exhaust duct 43. Air is supplied to channel 47 through a plurality of holes 48 in air chamber 40. As previously noted it is most important to understand that the flow of air through channel 47 is in a direction nearly opposite to that of exhaust gases from jet 39. Again I would like to point out that the direction of flow in channel 47 is a most important feature of the invention since it eliminates turning losses which greatly facilitates the induction process.

Exhaust duct 43 is in communication with the opening 44 of exhaust manifold 45. The opening 44 has a protruding surface 46 downstream of the direction of flow in manifold 45 which decreases the pressure in opening 44 by a slight aspirating effect and thus facilitates the flow in exhaust duct 43 and sustains a slight stream momentum of air flowing in channel 47 after the exhaust cycle is complete which helps to purge air chamber 40 of exhaust gases.

Figure 5:
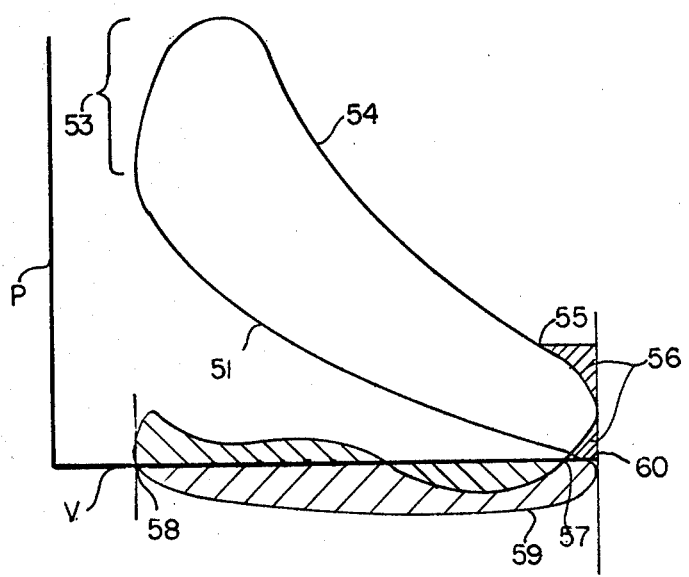
FIG. 5 Is an engine indicator cord pressure trace diagram showing the relevant bottom-cycle events occuring in the 4-stroke engine process.

Referring now to FIG. 5 which is a diagrammatic illustration of a typical indicator card trace for a 4-stroke engine cycle. Engine cylinder pressure is shown along the ordinate axis P and volume is along the absicca V. The pressure during the piston compression stroke is designated as curve line 51 with the upper portion shown in bracket 53 designating the ignition and combustion which may be interpreted as either constant volume or as constant pressure operation without effecting the meaning of the discussion of the bottom-cycle events which follow.

Line 54 is the expansion pressure curve during the piston power stroke. At the point 55 the exhaust valve opens and the blow-down period 56 begins. The blow-down period 56 is the first bottom-cycle event to be discussed and is designated by the cross-hatched area. During the blow-down period 56 the initial flow through the engine upper cylinder poppet valve and through side-port 6 of FIG. 1 or side port 35 of FIG. 4 is sonic since the cylinder pressure is more than twice the magnitude of pressure in their respective exhaust manifolds 22 and 45. The flow through side-ports 6 and 35 of FIGS. 1 and 4 respectively compliments the flow of exhaust gases through the upper cylinder poppet valves and therefore helps to lower the engine cylinder pressure at a faster rate and thus reduce the quantity of heat transferred to the upper cylinder components. The decreased exhaust gas pressures and the reduction of the exhaust gas mass flowing through the upper cylinder exhaust ports significantly lowers the heat transfer rate to the hot gas control components such as the exhaust valve and exhaust valve seat. The blowdown period ends at point 57 on the pressure trace which is the point where the trace passes over the abscissa V.

That portion of the indicator card pressure trace shown in FIG. 5 extending from the point 57 to point 58 is the piston exhaust stroke. This is the second bottom-cycle event and represents a portion of the piston pumping losses. The section of the pressure trace between points 57 and 58 represents negative work and is the amount of energy required by the piston to push the exhaust gases out of the cylinder through the upper cylinder exhaust valve. By evacuating exhaust gas through side-port 6 of FIG. 1 or side port 35 of FIG. 4 less work is required by the piston to push the exhaust gas through the upper cylinder poppet valve and therefore less negative work is expended in the cycle making the engine more efficient.

The third bottom-cycle event occurs between points 58 and 59 on the indicator card pressure trace presented as FIG. 5. This portion of the trace represents the initial induction stroke with air being supplied to the engine cylinder from only the open intake poppet valve in the upper cylinder. At a point near the bottom of the induction stroke the piston 2 uncovers the cylinder side-port 6 of FIG. 1 or side-port 35 of FIG. 4. Because the pressure within the engine cylinder is lower than that in air-chamber 12 of FIG. 1 or air-chamber 40 of FIG. 4 air flows into the engine cylinder through the side-port during this part of the induction event sequence. Air flow through the side port supplements the air supply from the upper cylinder intake valve and thus the induction process more closely simulates the unthrottled condition which greatly facilitates the engine volumetric efficiency. Air flowing into the engine cylinder through the side-ports cools the piston crown and thus facilitates heat transfer in this area.

The improvements described herein for 4-stroke engines exemplify improvements that could be introduced in other types of piston driven engines within the scope of this specification.

What is claimed is:

1. A cylinder of an internal combustion engine having a plurality of such cylinders, a piston slidably mounted in said cylinder, a side port in said cylinder located at a point corresponding to a position near the bottom stroke of said piston, a jet which connects said side-port to an air-chamber placing said side port in communication with said air chamber, said jet being fixedly mounted between said side port and said air chamber, an exhaust duct fixedly attached to said air chamber at a point opposite and axially aligned with the center of flow from said jet, said air chamber supplied from a channel, air flow in said channel flowing in opposite direction of exhaust flow from said jet, said exhaust duct in communication with an exhaust manifold said inlet of said manifold having slight protrusion to facilitate flow in said exhaust duct.

2. Claim 1 in which said jet is shaped as a divergent nozzle.

3. Claim 1 in which said jet is shaped as a convergent nozzle.

4. Claim 1 in which said jet is a cylindrical shaped jet.

5. Claim 1 in which said exhaust duct is shaped as a conical diffuser.

6. Claim 1 in which said exhaust duct is cylindrical in shape.

7. Claim 1 in which said exhaust duct is conical in shape.

8. Claim 1 in which said exhaust duct is cylindrical in shape.

9. Claim 1 in which said jet and exhaust duct are cylindrical in shape.

* * * * *